United States Patent
Noguchi et al.

(10) Patent No.: US 8,759,772 B2
(45) Date of Patent: Jun. 24, 2014

(54) INFRARED SENSOR AND INFRARED ARRAY SENSOR

(75) Inventors: Hidetaka Noguchi, Sanda (JP); Hirofumi Watanabe, Miki (JP)

(73) Assignee: Ricoh Company, Ltd., Tokyo (JP)

( * ) Notice: Subject to any disclaimer, the term of this patent is extended or adjusted under 35 U.S.C. 154(b) by 186 days.

(21) Appl. No.: 13/350,875

(22) Filed: Jan. 16, 2012

(65) Prior Publication Data
US 2012/0181430 A1    Jul. 19, 2012

(30) Foreign Application Priority Data
Jan. 18, 2011    (JP) .................................. 2011-008163

(51) Int. Cl.
*G01J 5/20*    (2006.01)

(52) U.S. Cl.
USPC ...................................................... 250/338.4

(58) Field of Classification Search
CPC ......................................................... G01J 5/20
USPC ...................................................... 250/338.4
See application file for complete search history.

(56) References Cited

U.S. PATENT DOCUMENTS

| 7,368,715 B2 | 5/2008 | Watanabe |
| 2003/0109142 A1* | 6/2003 | Cable et al. ................... 438/708 |

FOREIGN PATENT DOCUMENTS

| JP | 2002-296121 | 10/2002 |
| JP | 2006-258562 | 9/2006 |
| JP | 2007-101213 | 4/2007 |

* cited by examiner

*Primary Examiner* — David Porta
*Assistant Examiner* — Hugh H Maupin
(74) *Attorney, Agent, or Firm* — Cooper & Dunham LLP

(57) ABSTRACT

An infrared sensor includes a MOSFET sensor, and a current source MOSFET which is connected to the MOSFET sensor in series and constitutes a constant current source for driving the MOSFET sensor with a constant current, wherein a terminal between the MOSFET sensor and the current source MOSFET constitutes a sensor output terminal, the MOSFET sensor is disposed on a heat-insulated structure, the current source MOSFET is disposed outside the heat-insulated structure, and the MOSFET sensor and the current source MOSFET are constituted by a same conductivity type MOSFET and operate in a subthreshold region.

8 Claims, 10 Drawing Sheets

INFRARED SENSOR AND INFRARED ARRAY SENSOR

PRIORITY CLAIM

The present application is based on and claims priority from Japanese Patent Application No. 2011-008163, filed on Jan. 18, 2011, the disclosure of which is hereby incorporated by reference in its entirety.

BACKGROUND

1. Technical Field

The present invention relates to an infrared sensor and an infrared sensor array, in particular, to a thermal type infrared sensor and a thermal type infrared array sensor including a MOSFET (Metal-Oxide-Semiconductor Field-Effect Transistor) sensor which operates in a subthreshold region.

2. Description of the Related Art

For example, Japanese Patent Application Publication 2006-258562 describes a thermal type infrared sensor including a MOSFET which operates as a temperature detector in a subthreshold region.

FIG. 11 provides a circuit diagram describing a configuration of a conventional thermal type infrared sensor.

The infrared sensor includes a MOSFET sensor 101 and a constant current source 103. The MOSFET sensor 101 is driven by a constant current Id applied from the constant current source 103, operates in a subthreshold region, and outputs a sensor output voltage Vout.

The MOSFET 101 sensor is formed on a heat-insulated structure for improving sensitivity to infrared light incidence. In this case, the heat-insulated structure is configured to thermally separate the MOSFET sensor and a substrate. In general, the heat-insulated structure is configured to support a thin-film membrane portion in which the MOSFET sensor 101 is formed in a hollow state with a plurality of beams.

FIGS. 12A, 12B provide schematic views each describing one example of a heat-insulated structure. FIG. 12A provides a plan view and FIG. 12B provides a sectional view in the A-A' position of FIG. 12A.

The heat-insulated structure is configured to support a membrane portion 105 with two beams 107. A space 111 is formed between a substrate 109 and the membrane portion 105.

The MOSFET sensor 101 is formed in the membrane portion 105, and is thermally separated from the substrate 109.

If infrared light enters the membrane portion 105, the temperature of the membrane portion 105 is increased, so that the temperature of the MOSFET sensor 101 formed in the membrane portion 105 is also increased. If the temperature of the MOSFET sensor 101 is changed, the threshold voltage of the MOSFET 101 is changed, and this change is obtained as a change in the sensor output voltage Vout. Namely, the thermal type infrared sensor uses the MOSFET sensor 101 as a temperature sensor, and captures a minute temperature change by the infrared light incidence so as to detect infrared light.

However, the thermal type infrared sensor has a problem in that the DC (direct-current voltage) level of the sensor output voltage is changed due to the effect of the ambient temperature. Namely, since the basic principle of the thermal type infrared sensor is a temperature sensor, if the temperature of the MOSFET sensor 101 is changed due to the change in the ambient temperature except for the infrared light incidence, the sensor output voltage Vout is changed. The MOSFET sensor 101 requires a large temperature coefficient of a threshold voltage in order to improve sensitivity to infrared light. However, the MOSFET sensor 101 also has a problem in that if the temperature coefficient of the threshold voltage is increased, the change in the sensor output voltage Vout due to the effect of the ambient temperature is increased.

FIG. 13 provides a circuit diagram describing one example of a conventional thermal type infrared sensor in which a constant current source is constituted by a P-type MOSFET 113.

With this configuration, the temperature property differs between the MOSFET sensor 101 constituted by an N-type MOSFET and the current source MOSFET 113 constituted by a P-type MOSFET, so that the DC level of the sensor output voltage Vout is changed due to a change in the ambient temperature similar to the configuration illustrated in FIG. 11.

To solve the above problem, a method of controlling an infrared sensor to a constant temperature with an electronic cooling element such as Peltier device is proposed. However, this method has a problem in that the configuration of the sensor portion becomes complex and the size of the sensor portion is increased due to a cooling element and a temperature controller being required for this method, resulting in the increase in the manufacturing costs. Moreover, this method also has a problem in that large power consumption is required for the Peliter device and the system for controlling the device, so that the power consumption of the entire system is increased.

To solve the above problem, a method of disposing a reference sensor is also proposed.

FIGS. 14A, 14B are circuit diagrams each describing an infrared sensor having a reference sensor. The infrared sensor includes a reference MOSFET sensor 115 and a constant current source 117 in addition to the MOSFET sensor 101 and the constant current source 103 illustrated in FIG. 11. The reference MOSFET sensor 115 is formed by a configuration which is the same as that of the MOSFET sensor 101, and the constant current source 117 is formed by a configuration which is the same as that of the constant current source 103. The reference MOSFET sensor 115 is formed in a position different from the heat-insulated structure. The reference MOSFET sensor 115 is driven by the constant current Id applied from the constant current source 117, operates in a subthreshold region, and outputs a sensor output voltage Vout 2. The effect due to the change in the ambient temperature can be removed based on the difference between the sensor output voltage Vout 1 of the MOSFET sensor 101 and the sensor output voltage Vout 2 of the reference MOSFET sensor 115.

By using this method, it becomes unnecessary to use a cooling device or the like. However, the DC levels of the sensor output voltages Vout 1, Vout 2 are changed due to a change in the ambient temperature. Specifically, if the infrared sensor is used in an area where the temperature sensitivity of the MOSFET sensors 105, 115 is large and the change in the ambient temperature is large, it becomes necessary to increase the power source voltage to be applied to the MOSFET sensors 101, 115 and a latter circuit which obtains the difference between the sensor output voltages Vout 1, Vout 2 in view of the DC level change in the sensor output voltages Vout 1, Vout 2 resulting from the temperature change. As described above, this method has a problem in that if the usage environment temperature area of the sensor is increased, the DC level changes of the sensor output signal and the reference temperature sensor output signal are increased, so that it becomes necessary to increase the power source voltage of the next stage circuit, and the low voltage operation is limited. This method also has a problem in that if the sensitivity of the sensor element is increased, the DC level change of the sensor output signal is increased, so that it becomes necessary to increase the power source voltage of the next stage circuit, and it becomes difficult to operate with high sensitivity and low voltage.

SUMMARY

It is, therefore, an object of the present invention to provide an infrared sensor and an infrared array sensor, which can reduce a DC level change of an output voltage of a thermal type infrared sensor without using an electronic cooling device such as Peltier device even if the ambient temperature is changed.

In order to achieve the above object, one embodiment of the present invention provides an infrared sensor including a MOSFET sensor, and a current source MOSFET which is connected to the MOSFET sensor in series and constitutes a constant current source for driving the MOSFET sensor with a constant current, wherein a terminal between the MOSFET sensor and the current source MOSFET constitutes a sensor output terminal, the MOSFET sensor is disposed on a heat-insulated structure, the current source MOSFET is disposed outside the heat-insulated structure, and the MOSFET sensor and the current source MOSFET are constituted by a same conductivity type MOSFET and operate in a subthreshold region.

BRIEF DESCRIPTION OF THE DRAWINGS

The accompanying drawings are included to provide further understanding of the invention, and are incorporated in and constitute a part of this specification. The drawings illustrate embodiments of the invention and, together with the specification, serve to explain the principle of the invention.

FIG. 12A provides a plan view and FIG. 12B provides a sectional view in the A-A' position in FIG. 12A.

DETAILED DESCRIPTION OF THE PREFERRED EMBODIMENTS

Figure 1:
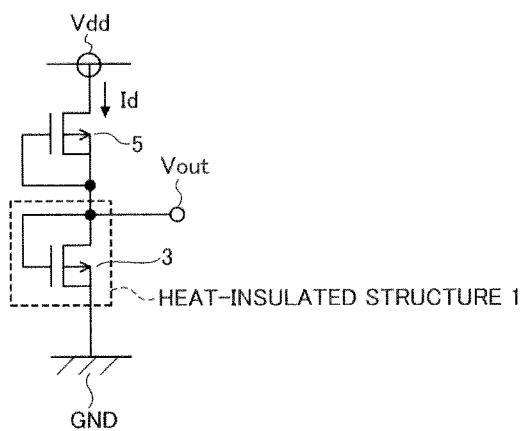
FIG. 1 is a circuit diagram describing one embodiment.

FIG. 1 is a circuit diagram describing one embodiment.

Figure 12A:
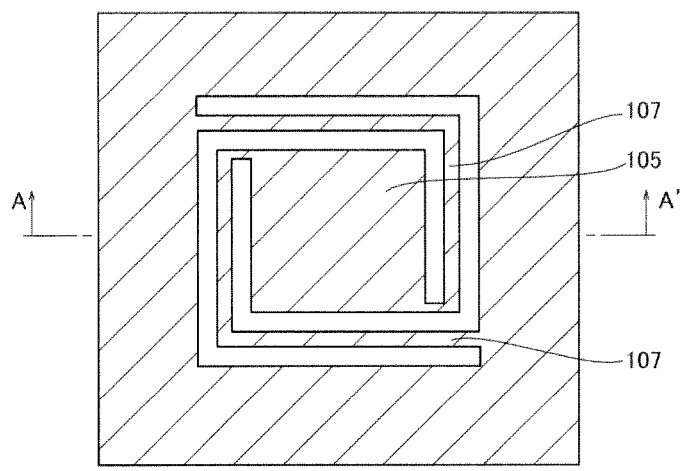
FIGS. 12A, 12B are schematic views each describing one embodiment of a heat-insulated structure.
Figure 12B:
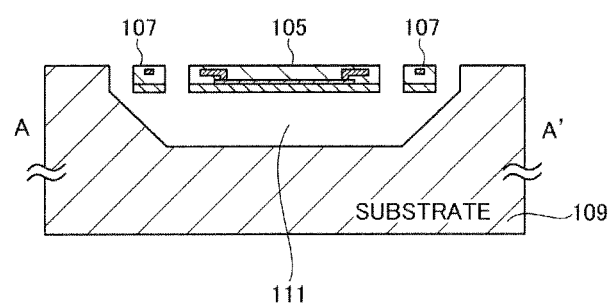
Figure 13:
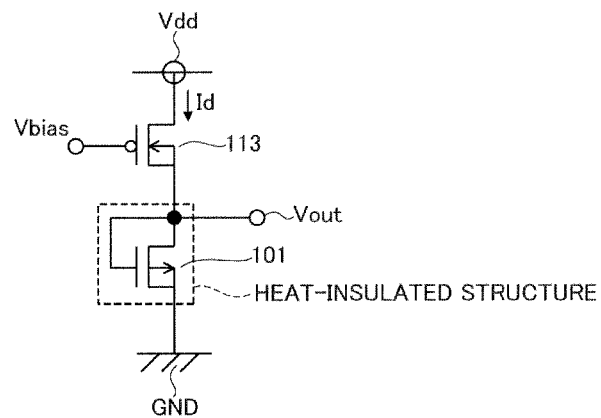
FIG. 13 is a circuit diagram describing one example of a conventional infrared sensor in which a constant current source is constituted by a P-type MOSFET 113.
Figure 14A:
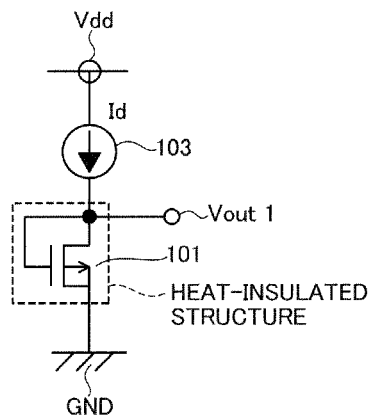
FIGS. 14A, 14B are circuit diagrams each describing an infrared sensor having a reference sensor.
Figure 14B:
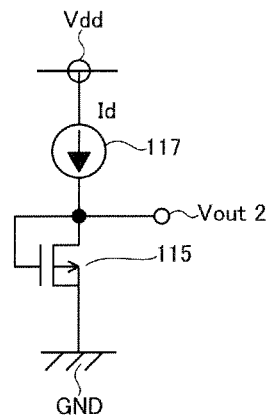

An infrared sensor of the present embodiment includes a MOSFET sensor 3 formed on a heat-insulated structure 1 (refer to FIG. 12) and a current source MOSFET 5 formed outside the heat-insulated structure 1. The MOSFET sensor 3 and the current source MOSFET 5 are the same conductivity type MOSFET, for example, an N-type MOSFET, which operates in a subthreshold region.

The MOSFET sensor 3 is a diode-connected transistor with a gate-drain short-circuited. The current source MOSFET 5 includes a gate-source short-circuit. With the gate-source short-circuit, the current source MOSFET 5 can produce a stable constant current source without requiring a special bias voltage.

The MOSFET sensor 3 and the current source MOSFET 5 connected as described above are connected in series between a power source Vdd and a ground GND. The voltage of the connection node of the MOSFET sensor 3 and the current source MOSFET 5 is used as a sensor output voltage Vout.

Figure 2:
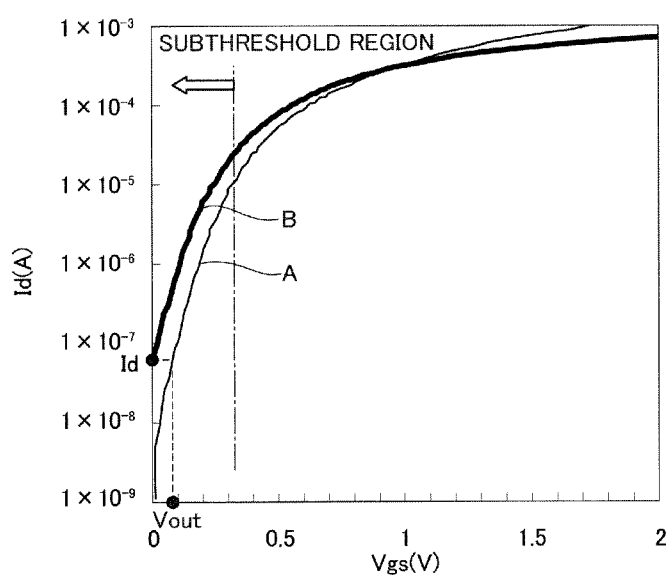
FIG. 2 is a view illustrating a Vgs-Id feature of a MOSFET, the waveform A illustrates a Vgs-Id feature when a MOSFET in which the threshold voltage is Vtha is diode-connected, and the waveform B illustrates a Vgs-Id feature in a constant Vds (voltage between source and drain) of a MOSFET in which the threshold voltage is Vthb.

FIG. 2 is a view illustrating a Vgs-Id feature of a MOSFET. In FIG. 2, the waveform A illustrates a Vgs-Id feature when the MOSFET having a threshold voltage of Vtha is diode-connected and the waveform B illustrates a Vgs-Id feature in a constant Vds (voltage between source and drain) of a MOSFET having a threshold voltage of Vthb. In FIG. 2, the left area from the dashed line illustrates an approximate subthreshold region.

For example, if the MOSFET sensor 3 in FIG. 1 is the feature of the waveform A in FIG. 2 and the current source MOSFET 5 in FIG. 1 is the feature of the waveform B in FIG. 2, the point where Vgs of the waveform B=0 becomes the current source current Id, and the voltage determined from the current source current Id and the feature of the waveform A becomes the sensor output voltage Vout. In this case, the sensor output voltage Vout becomes substantially equal to the threshold voltage difference ΔVth of the MOSFETs 3, 5.

In the after-described multistage connection configuration, it is necessary to reduce the sensor output voltage Vout in FIG. 1, i.e., the threshold voltage difference ΔVth in order to enable a low-voltage operation. For example, when outputting the sensor output voltage Vout≈the threshold voltage difference ΔVth=50 mV, if the MOSFETs 3, 5 in FIG. 1 operate in a saturation region, Vds differs between the MOSFET sensor 3 and the current source MOSFET 5. By this Vds difference, the sensor output voltage Vout>the threshold voltage difference ΔVth is established; thus, a target minute threshold voltage difference ΔVth can not be output.

In this embodiment, both of the MOSFET sensor 3 and the current source MOSFET 5 in FIG. 1 operate in a subthreshold region, so that a minute sensor output voltage Vout≈threshold voltage difference ΔVth can be output. This is because the current flowing to the MOSFET in the subthreshold region hardly depends on the Vds of the voltage between the source and the drain.

In the sensor of this embodiment, it is necessary to design the subthreshold region current of the MOSFET sensor 3 to be the subthreshold current of the current source MOSFET 5 or below in the same gate bias (the same Vgs). With this design, a minute sensor output voltage Vout≈threshold voltage difference ΔVth can be output in the sensor illustrated in FIG. 1.

Figure 3:
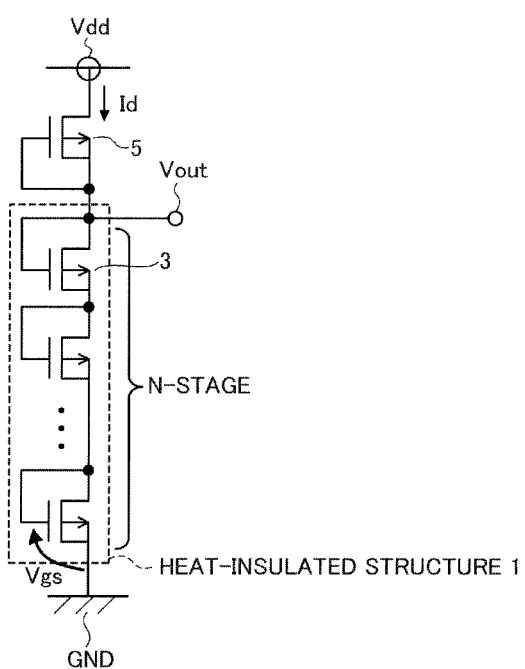
FIG. 3 is a circuit diagram describing another embodiment.

FIG. 3 provides a circuit diagram describing another embodiment.

In this embodiment, N-stage MOSFET sensors 3 are connected in series. Similar to the one-stage configuration illustrated in FIG. 1, the N-stage MOSFET sensors 3 are formed on the heat-insulated structure 1. By connecting the N-stage MOSFET sensors 3, N-time sensitivity of the infrared sensor can be obtained.

In this case, since N-time DC level of the sensor output voltage Vout can be obtained compared to the one-stage configuration, it becomes necessary to reduce Vgs per one stage of the MOSFET sensor 3. As described above, the MOSFET sensor 3 and the current source MOSFET 5 operate in the subthreshold region, and the difference ΔVth of the threshold voltage of the MOSFET sensor 3 and the threshold voltage of the current source MOSFET 5 is reduced, so that Vgs per one stage of the MOSFET 3 (Vout in FIG. 1) can be reduced.

For example, when Vgs per one stage of the MOSFET 3 is 50 mV and 50 stages are connected in series, Vout in FIG. 3 becomes 2.5 V, and the sensor can be driven with the current source voltage of 3V. In this case, the sensitivity becomes 50 times compared to the one-stage MOSFET 3.

Figure 4:
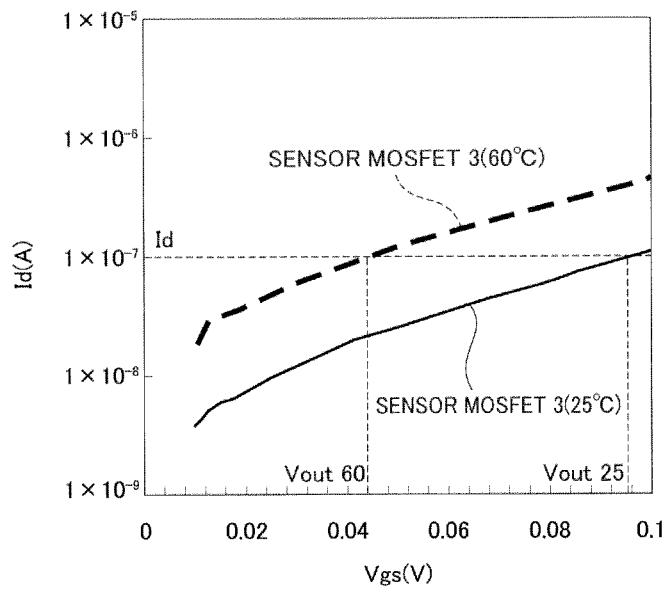
FIG. 4 is a view illustrating one example of an Id-Vgs feature of a MOSFET sensor.

FIG. 4 provides a view illustrating one example of an Id-Vgs feature of a MOSFET sensor.

Figure 11:
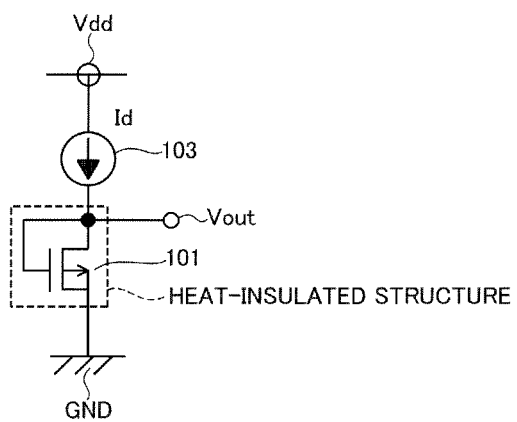
FIG. 11 is a circuit diagram describing a configuration of a conventional thermal type infrared sensor.

If the conventional infrared sensor illustrated in FIG. 11 is designed such that the current source 103 does not have temperature dependency, the current Id becomes constant without depending on an ambient temperature. On the other hand, the feature of the MOSFET sensor 101 is changed as illustrated in FIG. 4 when the ambient temperature is 25° C. and when the ambient temperature is 60° C. When the ambient temperature is 25° C., the sensor output voltage Vout 25 is about 0.096 V whereas when the ambient temperature is 60° C., the sensor output voltage Vout 60 becomes about 0.044 V, generating about 0.052 V difference. This is a small difference in the one-stage configuration illustrated in FIG. 11, but the influence is increased in the multistage configuration illustrated in FIG. 3. For example, If N=50 stages in the multistage configuration, when the ambient temperature is 25° C., the sensor output voltage Vout becomes about 4.8 V and when the ambient temperature is 60° C., the sensor output voltage Vout is lowered to about 2.2 V.

If the ambient temperature is lowered, the sensor output voltage Vout is shifted in the direction which becomes higher than 4.8 V. If the operating temperature range of the infrared sensor is set to 0-80° C., the variation range of the sensor output voltage Vout approaches 5 V. In order to improve the sensitivity of the infrared sensor, if the temperature coefficient of the MOSFET sensor 3 is increased, the variation of the sensor output voltage Vout due to the change in the ambient temperature is further increased.

As described above, the conventional technique is configured to control the temperature of the MOSFET sensor to be constant by using a cooling element such as Peltier device, so as to control the variation of Vout due to the change in the ambient temperature.

Figure 5:
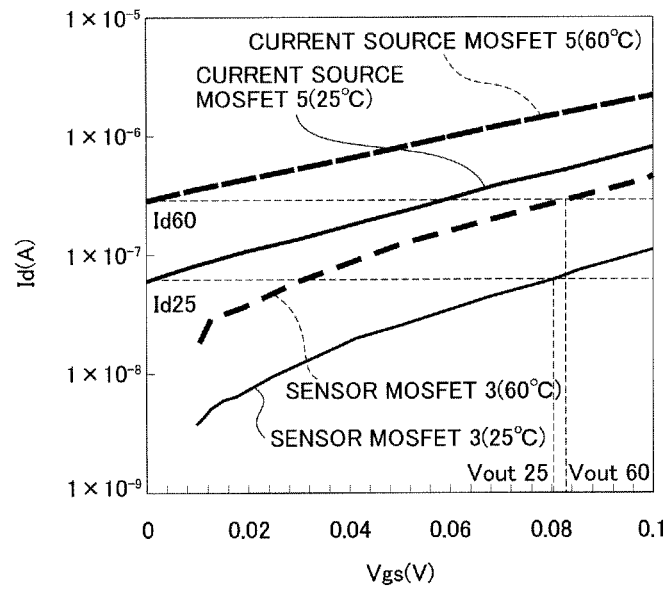
FIG. 5 is a view illustrating one example of an Id-Vgs feature of a current source MOSFET and a MOSFET sensor constituting the infrared sensor illustrated in FIG. 1.

FIG. 5 provides a view illustrating one example of an Id-Vgs feature of the MOSFET sensor 3 and the current source MOSFET 5 constituting the infrared sensor illustrated in FIG. 1.

When the ambient temperature is 25° C., the output voltage Vout 25 is about 0.080 V from the relationship between the current Id 25 from the current source MOSFET 5 and the feature of the MOSFET sensor 3. When the ambient temperature is 60° C., the output voltage Vout 2 is about 0.082 V from the relationship between the current Id 60 from the current source MOSFET 5 and the feature of the MOSFET sensor 3. As described above, when the ambient temperature is 25-60° C., the variation of the sensor output voltage Vout becomes about 0.002 V, and the variation of the sensor output voltage Vout is controlled to about 1/26 compared to the conventional sensor illustrated in FIGS. 11, 4.

In the case of N=50 stages in the multistage configuration illustrated in FIG. 3, when the ambient temperature is 25° C., the sensor output voltage Vout becomes about 4.0 V and when the ambient temperature is 60° C., the sensor output voltage Vout becomes about 4.1 V, and the DC level change of the sensor output voltage Vout is small relative to the ambient temperature variation, so that a small infrared sensor having a multistage configuration can be achieved.

The feature of the present invention is that the MOSFET sensor 3 and the current source MOSFET 5 are constituted by the same conductivity type MOSFET, and operate in a subthreshold region, so that the MOSFET sensor 3 and the current source MOSFET 5 have almost the same temperature property. Accordingly, even if the ambient temperature changes, the sensor output voltage Vout can be maintained virtually constant without using a cooling element such as Peltier element. By controlling the variation of the sensor output voltage Vout, the power source voltage can be lowered, and the low voltage operation and low power consumption operation can be achieved.

In order to control the variation of the sensor output voltage due to the change in the ambient temperature with higher accuracy, it is preferable to match the temperature properties of the MOSFET sensor 3 and the current source MOSFET 5. To do this, the same configuration is used for both of the MOSFET sensor 3 and the current source MOSFET 5 in addition to using the same conductivity type MOSFET for both of the MOSFET sensor 3 and the current source MOSFET 5. More specifically, by setting the MOSFET sensor 3 and the current source MOSFET 5 to be the same size (gate length and gate width), the temperature properties of the MOSFET sensor 3 and the current source MOSFET 5 become closer to each other, so that the variation in the sensor output voltage Vout due to the change in the ambient temperature can be controlled with higher accuracy.

Moreover, in order to control the variation of the sensor output voltage Vout due to the change in the ambient temperature with high accuracy, the channel impurity concentration and the profile of the MOSFET sensor 3 and the current source MOSFET 5 are set to be the same. More specifically, the MOSFET sensor 3 and the current source MOSFET 5 are constituted by completely the same MOSFET having the same conductivity type, structure and threshold voltage (two such transistors are referred to as a pair transistor). However, the connection is as illustrated in FIG. 1 or FIG. 3.

Figure 6:
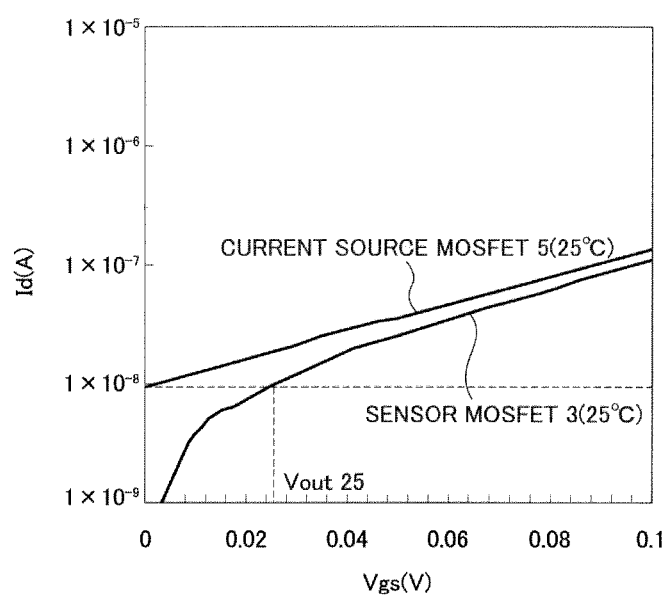
FIG. 6 is a view illustrating one example of an Id-Vgs feature of a MOSFET in which the MOSFET sensor and the current source MOSFET constituting the infrared sensor illustrated in FIG. 1 are constituted by a pair transistor.

FIG. 6 provides a view illustrating one example of an Id-Vgs feature of the MOSFET sensor 3 and the current source MOSFET 5 when the MOSFET sensor 3 and the current source MOSFET 5 constituting the infrared sensor illustrated in FIG. 1 are constituted by a pair transistor.

As illustrated in FIG. 6, when the MOSFET sensor 3 and the current source MOSFET 5 are constituted by the pair transistor of the completely same configuration, a very small voltage in which the sensor output voltage Vout 25 is about 25 mV is output by the connection difference. For this reason, the multistage illustrated in FIG. 3 can be easily obtained.

In addition, since the MOSFET sensor 3 and the current source MOSFET 5 are constituted by exactly the same MOSFET configuration, a stable sensor output voltage Vout in which the variation of the process is very small can be produced.

As described above, if the MOSFET sensor 3 and the current source MOSFET 5 are constituted by the same pair transistor configuration, the stable sensor output voltage Vout can be easily produced. However, even if the MOSFET sensor 3 and the current source MOSFET 5 are not constituted by the same pair transistor configuration, the sensor of the present invention can be achieved. For example, the MOSFET sensor 3 and the current source MOSFET 5 can be the same transistor configuration except for the channel impurity concentration. Moreover, the MOSFET sensor 3 and the current source MOSFET 5 are the same transistor configuration except for the gate impurity concentration. However, when the voltage between the gate and the source is the same in the MOSFET sensor 3 and the current source MOSFET 5, the subthreshold region current of the MOSFET sensor 3 is set to be the subthreshold region current of the current source MOSFET 5 or below.

The two MOSFETs in which the channel impurity concentration or the gate impurity concentration differs with respect to one another differ in a threshold voltage. Namely, by the different channel impurity concentration and gate impurity concentration in the MOSFET sensor 3 and the current source MOSFET 5, the threshold voltage difference ΔVth of the MOSFET sensor 3 and the current source MOSFET 5 can be controlled to a desired value, so that a smaller threshold voltage difference ΔVth can be obtained. Therefore, a highly-sensitive infrared sensor can be formed by further increasing the number of the MOSFET sensors 3. Since the temperature sensitivity of the MOSFET sensor differs according to the threshold voltage of the MOSFET sensor, a highly-sensitive infrared sensor can be formed by adjusting the threshold voltage of the MOSFET sensor to a value in which the temperature sensitivity is increased.

As described above, the MOSFET sensor 3 and the current source MOSFET 5 are constituted by the N-type MOSFET, but the MOSFET sensor and the current source MOSFET can be constituted by a P-type MOSFET.

Figure 7:
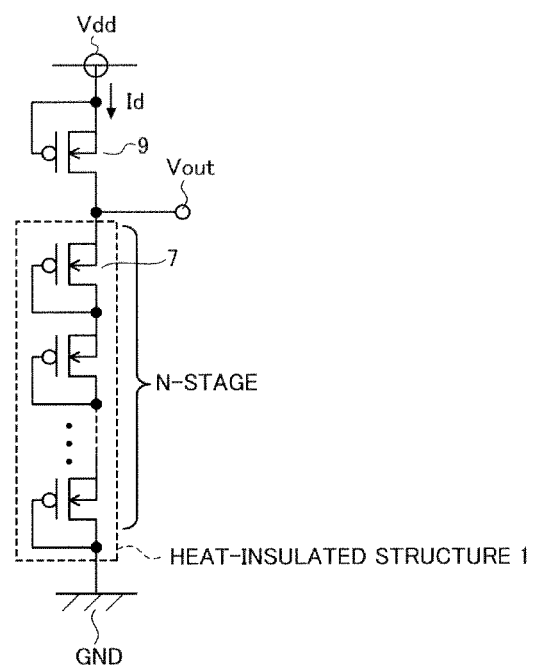
FIG. 7 is a circuit diagram describing another embodiment.

FIG. 7 provides a circuit diagram describing another embodiment.

The embodiment includes N-stage MOSFET sensors 7 formed on the heat-insulated structure 1 and a current source MOSFET 9 formed outside the heat-insulated structure 1. The MOSFET sensor 7 and the current source MOSFET 9 are constituted by a P-type MOSFET which operates in a subthreshold region.

Each MOSFET sensor 7 is a diode-connected transistor with a gate-drain short-circuited. The current source MOSFET 9 includes a gate-source short-circuit. The voltage of the connection node of the MOSFET sensor 7 and the current source MOSFET 9 is used as the sensor output voltage Vout.

This embodiment can obtain the function and the effect similar to those of the sensor having the N-type MOSFET sensor 3 and current source MOSFET 5 illustrated in FIG. 3.

This embodiment includes the N-stage MOSFET sensors 7, but one-stage MOSFET sensor can be used.

Figure 8:
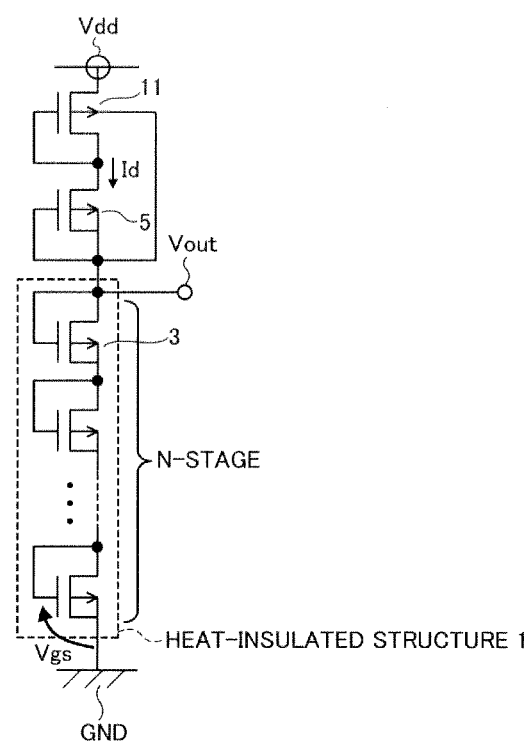
FIG. 8 is a circuit diagram describing another embodiment.

FIG. 8 provides a circuit diagram describing another embodiment.

In this embodiment, the constant current source includes two MOSFETs of the current source MOSFET 5 and the second current source MOSFET 11. The second current source MOSFET 11 is configured to control the change in the current Id due to the variation in the power source voltage Vdd. The second current source MOSFET 11 is connected in series between the power source Vdd and the current source MOSFET 5, and includes a gate-source short-circuit and a back gate connected to the sensor output voltage Vout.

By connecting the second current source MOSFET 11 as described above, even if the current Id is changed due to the variation in the power source voltage Vdd, the variation in the sensor output voltage Vout is fed back to the back gate of the second current source MOSFET 11, so that the change in the current Id is controlled. The second current source MOSFET 11 is a MOSFET which is the same as that of the current source MOSFET 5 or is designed to flow current larger than the current in the current source MOSFET 5 such that the current Id is not controlled by the second current source MOSFET 11.

Figure 9:
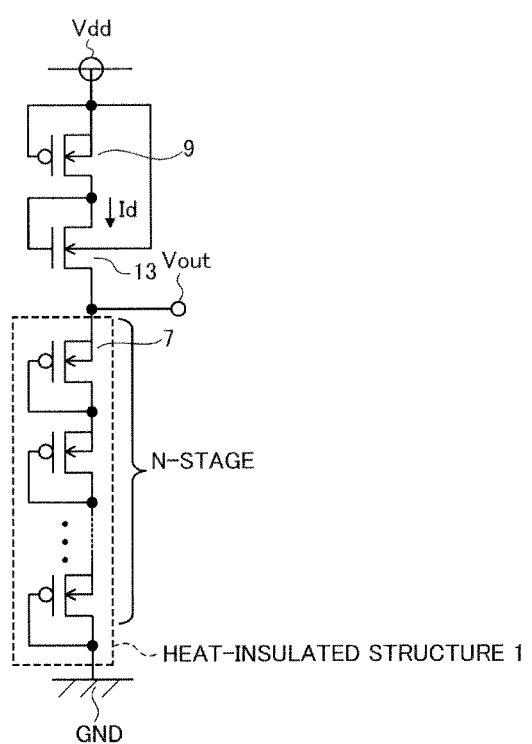
FIG. 9 is a circuit diagram describing another embodiment.

FIG. 9 provides a circuit diagram describing another embodiment.

This embodiment further includes a P-type third current source MOSFET 13 in addition to the configuration of the sensor in FIG. 7 constituted by the P-type MOSFET. The third current source MOSFET 13 is connected in series between the MOSFET sensor 7 and the current source MOSFET 9, and has a gate-source short-circuit and a back gate connected to the power source Vdd.

By connecting the third current source MOSFET 13 as described above, even if the power source voltage Vdd is changed, the voltage between Vdd and the back gate of the third current source MOSFET 13 is fed back, so that the change in the current Id is controlled. The third current source MOSFET 13 is a MOSFET which is the same as that in the current source MOSFET 9 or is designed to flow a current larger than the current in the current source MOSFET 5 such that the current Id is not controlled by the current source MOSFET 11.

Figure 10:
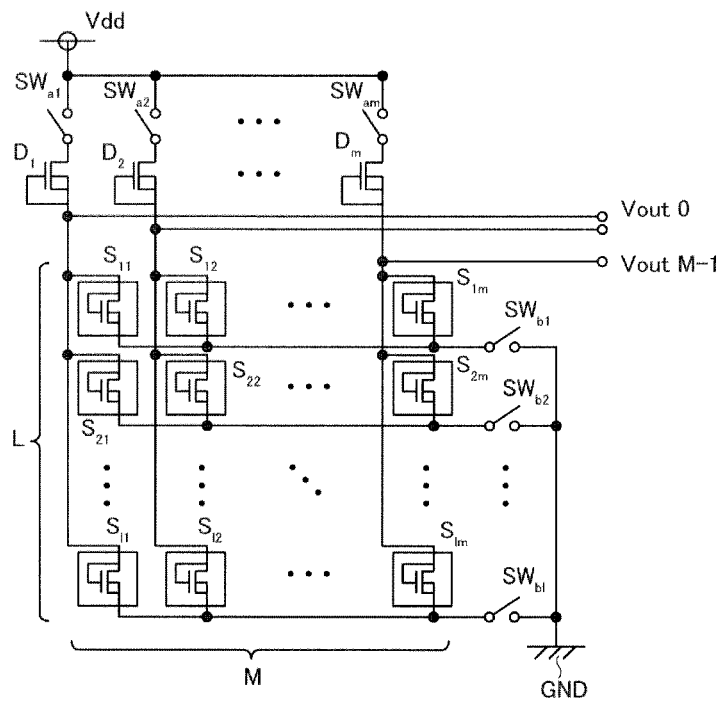
FIG. 10 is a circuit diagram describing another embodiment and illustrating one example of an infrared sensor array.

FIG. 10 provides a circuit diagram describing another embodiment and illustrating one example of an infrared array sensor.

The array sensor includes L×M pixels S11-S1$m$, constant current sources D1-Dm, column selection switches SWa1-SWam, and line selection switches SWb1-SWb1, and outputs output sensor output voltage Vout 0-sensor output voltage Vout M−1. In addition, in a line sensor of L=1, the column selection switch and the line selection switch are unnecessary.

As described in the above embodiment, each pixel S11-S1$m$ is constituted by the heat-insulated structure and the MOSFET sensor. FIG. 10 provides a view illustrating one stage MOSFET sensor in each pixel S11-S1$m$, but multistage MOSFET sensors can be used in each pixel S11-S1$m$. For example, the number of stages can be determined according to the number which can be formed on the heat-insulated structure or the number based on the power source voltage.

The constant current sources are formed according to the number of columns and the number of lines, and the constant current is supplied to the pixel selected by the column selection switch and the line selection switch. Each of the constant current sources D1-Dm is constituted by one current source MOSFET, but each of the constant current sources D1-Dm can be constituted by two current source MOSFETs as described with reference to FIGS. 8. 9.

The sensor output voltage Vout 0-Vout M−1 obtained from each pixel is sequentially sent to the latter circuit such as an amplifier.

Since such an infrared sensor array is desired to be downsized and to lower the power consumption, an electric cooling element such as a Peltier device becomes unnecessary if the present invention is applied, and a low voltage operation can be performed; thus, the system can be significantly downsized, simplified, lowered in costs and also lowered in power consumption.

Although the embodiments of the present invention have been described above, the present invention is not limited thereto. It should be appreciated that variations may be made in the embodiments described by persons skilled in the art without departing from the scope of the present invention.

In the above embodiments, the current source MOSFETs 5, 9, 11, 13 include the gate-source short-circuit, but the present invention is not limited thereto. The current source MOSFET can be operated by applying a predetermined voltage to the gate of the current source MOSFET.

In the above embodiments, the MOSFETs 3, 7 constituting the MOSFET sensor include the gate-drain short-circuit, but the present invention is not limited thereto. The MOSFET sensor can be operated by applying predetermined voltage to the gate of the MOSFET constituting the MOSFET sensor.

The present invention can be applied to a device having an infrared sensor in which a property is changed according to heat generated by receiving infrared light or discharging infrared light such as a biological object detection sensor or an infrared camera.

According to the embodiments of the present invention, when the ambient temperature is changed, the temperature of the entire infrared sensor is changed. Since the MOSFET sensor and the current source MOSFET are constituted by the same conductivity type MOSFET, the properties of both of the MOSFETs are approximately equally changed. On the other hand, when infrared light enters, the temperature is changed only in the heat-insulated portion, so that the property of the MOSFET sensor formed on the heat-insulated structure is only changed; thus, the infrared light can be detected.

According to the embodiments of the present invention, the infrared sensor includes the MOSFET sensor and the current source MOSFET which is connected in series to the MOSFET sensor and constitutes the constant current source for driving the MOSFET sensor with a constant current. The terminal between the MOSFET sensor and the current source MOSFET constitutes the sensor output terminal. The MOSFET sensor is disposed on the heat-insulated structure. The current source MOSFET is disposed outside the heat-insulated structure. The MOSFET sensor and the current source MOSFET are constituted by the same conductivity type MOSFET, and operate in the subthreshold region. Therefore, the property of the MOSFET sensor and the property of the current source MOSFET substantially equally change relative to the change in the ambient temperature, and the DC level change of the sensor output voltage can be reduced.

Moreover, since a reference sensor is not required, the infrared sensor can be downsized and the circuit structure can be simplified compared to a case using a reference sensor.

Furthermore, since the MOSFET sensor and the current source MOSFET are manufactured with a general CMOS process, an amplifier circuit and a control circuit can be easily formed on the same substrate.

A conventional infrared sensor has a problem in that when increasing sensitivity with a multistage connection configuration of a sensor element such as a thermopile, the sensor output voltage is increased if the output voltage per one MOSFET sensor is not lowered, and a low voltage operation becomes difficult.

On the other hand, according to the infrared sensor of the embodiments of the present invention, both of the MOSFET sensor and the current source MOSFET operate in a subthreshold region, so that the sensor output voltage DC level can be lowered, and the sensitivity can be easily increased with the multistage connection configuration MOSFET sensor; thus, a low voltage operation can be performed.

The MOSFET sensor has the gate-drain short-circuit, and the power source MOSFET has the gate-source short-circuit. If the current in the subthreshold region of the MOSFET sensor is set to be smaller than the current in the subthreshold region of the current source MOSFET when the voltage between the gate and the source is the same in the MOSFET sensor and the current source MOSFET, the MOSFET sensor and the current source MOSFET can be operated if a voltage is not additionally supplied to the gate of the MOSFET sensor and the gate of the current source MOSFET.

In this case, if the current source MOSFET and the MOSFET sensor are constituted by the same configuration pair transistor, the current source MOSFET and the MOSFET sensor have the same temperature property, so that the DC level change of the sensor output voltage due to the change in the ambient temperature can be more effectively lowered.

Moreover, the current source MOSFET and the MOSFET sensor have the same transistor configuration except for the channel impurity concentration or the same transistor configuration except for the gate impurity concentration, so that the threshold voltage difference $\Delta V_{th}$ of the MOSFET sensor and the current source MOSFET, namely, the DC level of the sensor output voltage can be controlled to a desired value. For example, by obtaining a smaller threshold voltage difference $\Delta V_{th}$, a highly-sensitive infrared sensor can be formed by increasing the number of MOSFET sensors. By adjusting the threshold value of the MOSFET sensor to a value at which the temperature sensitivity is increased, a highly-sensitive infrared sensor can be formed.

According to the infrared sensor of the one embodiment of the present invention, the MOSFET sensor and the current source MOSFET are the N-type, and the constant current source is disposed outside the heat-insulated structure. The infrared sensor further includes the N-type second current source MOSFET which can flow a current such that the current source MOSFET flows in the subthreshold region or more. The second current source MOSFET is connected in series on the power source side of the power source MOSFET, and has the gate-source short-circuit and the back gate connected to the sensor output terminal. Therefore, even if the power source voltage is changed, the change in the sensor output voltage is fed back to the back gate of the second current source MOSFET, and the change in the current of the constant current source is controlled.

The MOSFET sensor and the current source MOSFET are the P-type MOSFET. The constant current source is disposed outside the heat-insulated structure, and further includes the P-type third current source MOSFET which can flow the current such that the current source MOSFET flows in the subthreshold region or more. The third current source MOSFET is connected in series between the current source MOSFET and the MOSFET sensor, and has the gate-source short-circuit and the back gate connected to the terminal on the power source side of the current source MOSFET. Therefore, even if the power source voltage is changed, the back gate of the third current source MOSFET is fed back, so that the change in the current of the constant current source is controlled.

According to the infrared array sensor of one embodiment of the present invention, the infrared sensors are disposed in an array, and include a plurality of switches for selecting a pixel. Since the constant current source is provided with respect to a plurality of MOSFET sensors arranged in the same column or the same line relative to the MOSFET sensors disposed in an array, it becomes unnecessary to use a cooling element such as Peltier device, and a low voltage operation can be performed, so that the system can be significantly downsized, simplified and lowered in costs and also reduced in power consumption

What is claimed is:
1. An infrared sensor, comprising:
a MOSFET sensor; and a current source MOSFET which is connected to the MOSFET sensor in series and constitutes a constant current source for driving the MOSFET sensor with a constant current, wherein a terminal between the MOSFET sensor and the current source MOSFET constitutes a sensor output terminal, the MOSFET sensor is disposed on a heat-insulated structure, the current source MOSFET is disposed outside the heat-insulated structure, and the MOSFET sensor and the current source MOSFET are constituted by a same conductivity type MOSFET and operate in a subthreshold region, wherein the MOSFET sensor includes a gate-drain short-circuit and the current source MOSFET includes a gate-source short-circuit, and when a voltage between the gate and the source is the same in the MOSFET sensor and the current source MOSFET, a current in the subthreshold region of the MOSFET sensor is set to be smaller than a current in the subthreshold region of the current source MOSFET.

2. The infrared sensor according to claim 1, wherein the MOSFET sensors are connected in series in multistage.

3. The infrared sensor according to claim 1, wherein the current source MOSFET and the MOSFET sensor have the same pair transistor configuration.

4. The infrared sensor according to claim 1, wherein the current source MOSFET and the MOSFET sensor have the same transistor configuration except for a channel impurity concentration.

5. The infrared sensor according to claim 1, wherein the current source MOSFET and the MOSFET sensor have the same transistor configuration except for a gate impurity concentration.

6. The infrared sensor according to claim 1, wherein the MOSFET sensor and the current source MOSFET are an N-type MOSFET, the constant current source includes an N-type second current source MOSFET disposed outside the heat-insulated structure, configured to flow a current such that the current source MOSFET flows in the subthreshold region or more, and the second current source MOSFET is connected in series on a power source side of the current source MOSFET, has a gate-source short-circuit, and a back gate connected to the sensor output terminal.

7. The infrared sensor according to claim 1, wherein the MOSFET sensor and the current source MOSFET are a P-type MOSFET, the constant current source includes a P-type third current source MOSFET disposed outside the heat-insulated structure, configured to flow a current such that the current source MOSFET flows in the subthreshold region or more, and the third current source MOSFET is connected in series between the current source MOSFET and the MOSFET sensor, has a gate-source short-circuit and a back gate connected to a terminal on a power source side of the current source MOSFET.

8. An infrared sensor array, comprising:

a plurality of infrared sensor arrays according to claim 1 disposed in an array; and a plurality of switches configured to select a pixel, wherein the constant current source is provided with respect to a plurality of MOSFET sensors arranged in a same column or a same line relative to the MOSFET sensors disposed in the array.

* * * * *